(12) United States Patent
Joseph et al.

(10) Patent No.: US 11,296,838 B2
(45) Date of Patent: Apr. 5, 2022

(54) CLUSTER-SET DETERMINATION FOR COMP BASED ON RELIABILITY AND DELAY BUDGET IN URLLC

(71) Applicant: QUALCOMM Incorporated, San Diego, CA (US)

(72) Inventors: Vinay Joseph, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/294,080

(22) Filed: Mar. 6, 2019

(65) Prior Publication Data

US 2019/0280834 A1 Sep. 12, 2019

Related U.S. Application Data

(60) Provisional application No. 62/639,593, filed on Mar. 7, 2018.

(51) Int. Cl.
*H04L 5/00* (2006.01)
*H04W 16/02* (2009.01)
(Continued)

(52) U.S. Cl.
CPC ........... *H04L 5/0032* (2013.01); *H04B 7/024* (2013.01); *H04B 7/026* (2013.01); *H04L 5/0035* (2013.01);
(Continued)

(58) Field of Classification Search
CPC ... H04L 5/0032; H04L 5/0035; H04L 5/0085; H04L 47/29; H04B 7/024; H04B 7/26; H04W 16/02
(Continued)

(56) References Cited

U.S. PATENT DOCUMENTS

| | | | |
|---|---|---|---|
| 2012/0177090 A1* | 7/2012 | Iwai | H04J 11/0023 375/219 |
| 2012/0236741 A1* | 9/2012 | Xu | H04B 7/024 370/252 |

(Continued)

FOREIGN PATENT DOCUMENTS

EP 2862385 A1 4/2015

OTHER PUBLICATIONS

International Search Report and Written Opinion—PCT/US2019/021129—ISA/EPO—dated Jun. 21, 2019.
(Continued)

*Primary Examiner* — Christopher R Crompton
(74) *Attorney, Agent, or Firm* — Arent Fox, LLP

(57) ABSTRACT

Various aspects described herein relate to techniques for communications in a coordinated multi-point (CoMP) wireless communications system. In an aspect, a method of wireless communications may include receiving a request to form a CoMP cluster set of transmit/receive points (TRPs) for a user equipment (UE), determine the CoMP cluster set of TRPs for the UE based on at least a delay budget and a reliability requirement, and one or more of configuration information and measurements, and coordinate communications for the UE using the CoMP cluster set. The techniques described herein may apply to different communications technologies, including 5th Generation (5G) New Radio (NR) communications technology.

30 Claims, 5 Drawing Sheets

(51) Int. Cl.
  *H04B 7/024* (2017.01)
  *H04L 47/10* (2022.01)
  *H04B 7/026* (2017.01)

(52) U.S. Cl.
  CPC ............ *H04L 5/0085* (2013.01); *H04L 47/29* (2013.01); *H04W 16/02* (2013.01)

(58) Field of Classification Search
  USPC .......................................................... 370/254
  See application file for complete search history.

(56) References Cited

U.S. PATENT DOCUMENTS

| | | | | |
|---|---|---|---|---|
| 2015/0117291 | A1* | 4/2015 | Seo | H04L 5/0073 370/312 |
| 2015/0208263 | A1* | 7/2015 | Behravan | H04L 5/0057 370/252 |
| 2016/0309465 | A1* | 10/2016 | Padfield | H04L 5/0005 |
| 2017/0230131 | A1* | 8/2017 | Kronestedt | H04J 11/0053 |
| 2017/0277806 | A1* | 9/2017 | Trossen | H04L 67/2842 |
| 2019/0053278 | A1* | 2/2019 | Kecicioglu | H04L 27/0006 |
| 2019/0238190 | A1* | 8/2019 | Sun | H04W 40/32 |

OTHER PUBLICATIONS

NTT Docomo., et al., "DL Control Channel Design for URLLC", 3GPP Draft; R1-1718206, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Oct. 9, 2017-Oct. 13, 2017, Oct. 3, 2017 (Oct. 3, 2017), pp. 1-4, XP051352914, Retrieved from the Internet: URL: https://www.3gpp.org/ftp/tsg_ran/WG1_RL1/TSGR1_90b/Docs/ [retrieved on Oct. 3, 2017], Section 2, Subsections 2.1 and 2.2.

* cited by examiner

CLUSTER-SET DETERMINATION FOR COMP BASED ON RELIABILITY AND DELAY BUDGET IN URLLC

CLAIM OF PRIORITY UNDER 35 U.S.C. § 119

This application claims the benefit of U.S. Provisional Application Ser. No. 62/639,593, entitled "CLUSTER-SET DETERMINATION FOR COMP BASED ON RELIABILITY AND DELAY BUDGET IN URLLC" and filed on Mar. 7, 2018, which is expressly incorporated by reference in its entirety.

BACKGROUND

Aspects of the present disclosure relate generally to wireless communications systems, and more particularly, to determining a cluster set for coordinated multi-point (CoMP) based on a reliability requirement and a delay budget in ultra-reliable-low latency communications (URLLC).

Wireless communications systems are widely deployed to provide various types of communication content such as voice, video, packet data, messaging, broadcast and so on. These systems may be multiple access systems capable of supporting communication with multiple users by sharing available system resources (e.g., time, frequency, and power). Examples of such multiple-access technologies include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). In LTE-A network, coordinated multi-point (CoMP) operation is introduced to improve network performance, for example, at cell edges. In CoMP a number of transmit (TX) points provide coordinated transmission(s) in the downlink, a number of receive (RX) points provide coordinated reception(s) in the uplink, and the coordination may be done for both homogenous networks as well as heterogeneous networks. However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology may include, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC), which may allow a very large number of connected devices and transmission of a relatively low volume of non-delay-sensitive information. In an aspect, for varied deployments and/or applications, 5G NR communications technology may use enhanced subframe design and structure, and efficient waveform modulation and coding schemes. In addition, as the demand for mobile broadband access continues to increase, there exists a need for further improvements in 5G communications technology and beyond.

For example, for NR communications technology and beyond, conventional cluster set determination solutions may not provide a desired level of speed or customization for efficient cluster set determinations that account for a delay budget and reliability requirement for a user equipment (UE). Thus, improvements in wireless communications operations that account for the delay budget and reliability requirement for a UE may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to determining a cluster set for coordinated multi-point (CoMP) based on a delay budget and a reliability requirement in a wireless communications system is provided. The method includes receiving a request to form a COMP cluster set of transmit/receive points (TRPs) for a user equipment (UE), determining the CoMP cluster set of TRPs for the UE based on at least the delay budget and the reliability requirement, and one or more of configuration information and measurements, and coordinating communications for the UE using the CoMP cluster set. The method may be performed by a network entity, such as a TRP.

In another aspect, an apparatus for determining a cluster set for CoMP based on a delay budget and a reliability requirement in a wireless communications system is provided. The apparatus includes a memory and a processor communicatively coupled with the memory. The processor is configured to receive a request to form a CoMP cluster of TRPs for a UE, determine the CoMP cluster set of TRPs for the UE based on at least the delay budget and the reliability requirement, and one or more of configuration information and measurements, and coordinate communications for the UE using the CoMP cluster set. The apparatus may be a network entity, such as a TRP.

In another aspect, an apparatus for determining a cluster set for CoMP based on a delay budget and a reliability requirement in a wireless communications system is provided. The apparatus includes means for receiving a request to form a CoMP cluster of TRPs for a UE, means for determining the CoMP cluster set of TRPs for the UE based on at least the delay budget and the reliability requirement, and one or more of configuration information and measurements, and means for coordinating communications for the UE using the CoMP cluster set. The apparatus may be a network entity, such as a TRP.

In another aspect, a non-transitory computer-readable medium storing computer code executable by a processor of a network entity to determine a cluster set for CoMP based on a delay budget and a reliability requirement in a wireless communications system is provided. The computer-readable medium may include one or more codes executable to receive a request to form a CoMP cluster of TRPs for a UE, one or more codes executable to determine the CoMP cluster set of TRPs for the UE based on at least a delay budget and a reliability requirement, and one or more of configuration information and measurements, and one or more codes executable to coordinate communications for the UE using the CoMP cluster set. The network entity may be a TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
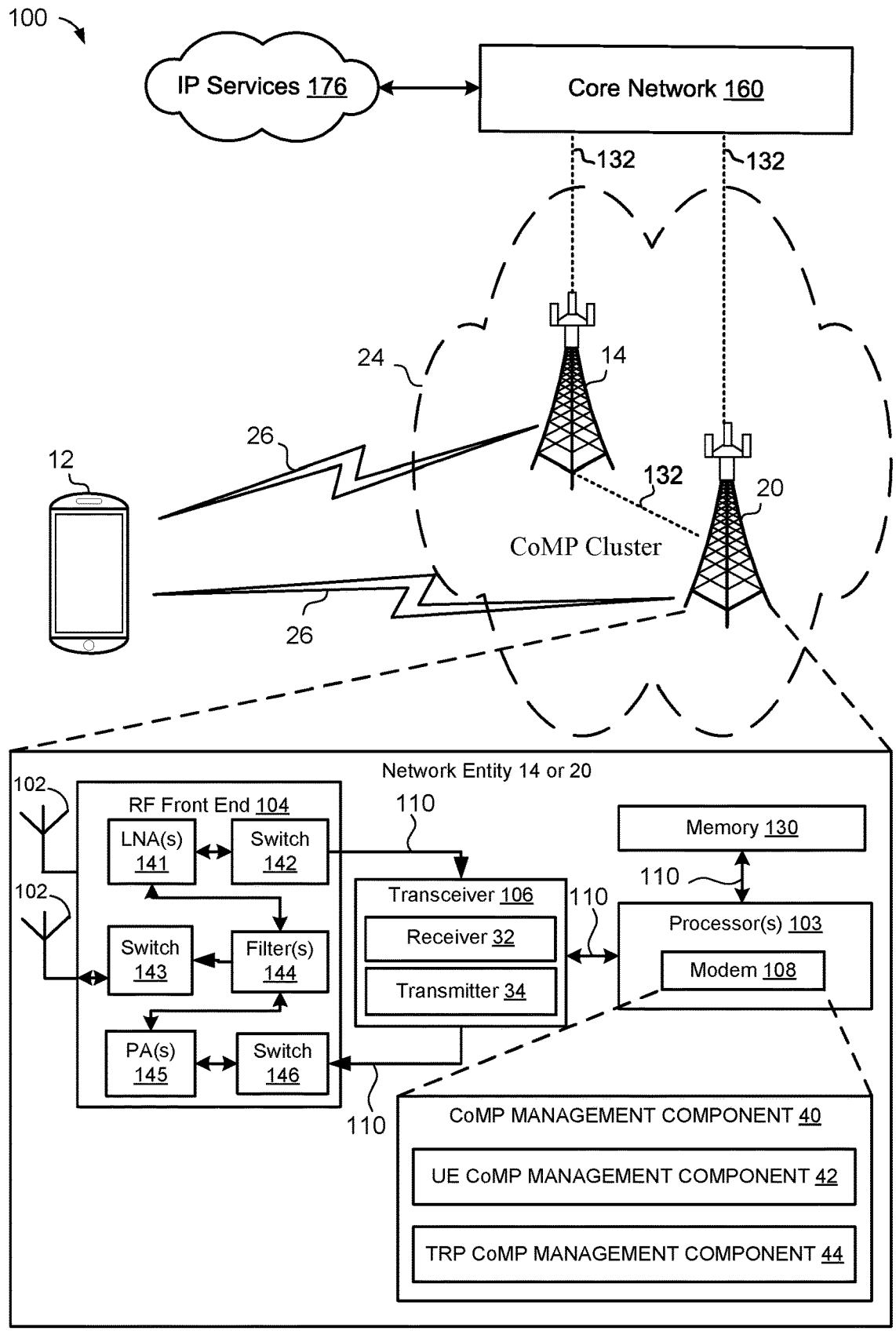
FIG. 1 is a block diagram of an example communications network including at least two transmit/receive points (TRPs) in communication with a user equipment (UE) configured to determine a CoMP cluster set of TRPs and coordinate communications for the UE using the CoMP cluster set, according to one or more of the presently described aspects.

In a wireless communications network (e.g., an LTE network, or a 5G NR network), coordinated multi-point (CoMP) operations may be used to improve system or network reliability and performance, for example, for cell-edge users. Categories of CoMP operation or methods are discussed in 3GPP TR 36.819 and include Coordinated Scheduling, Coordinated Beamforming, Joint Processing, etc. In some implementations using CoMP operations, transmit/receive points (TRPs) within a CoMP cluster set may be determined using a delay budget and reliability requirement of the UE. For example, a network entity, such as a TRP or controller receives a request to form a CoMP cluster of TRPs for a UE. The network entity determines the CoMP cluster set of TRPs for the UE based on at least delay budget and a reliability requirement, and one or more of configuration information and measurements, and coordinates communications for the UE using the CoMP cluster set. The configuration information and measurements may be provided to the network entity by the UE. The configuration information and measurements may be provided by another network entity (e.g., home subscriber server (HSS), operations and management (OAM) entity, unified data management (UDM) function, etc.)) or manually configured. The delay budget and the reliability requirements may be configured manually, provided by another network entity (e.g., HSS, OAM, UDM, etc.) or obtained from corresponding non-access stratum (NAS) signaling (e.g., using evolved packet system (EPS) quality of service (QoS) information element(s) in activate default EPS bearer context request message, active dedicated EPS bearer context request message, modify EPS bearer context request message or similar messages). See e.g., 3 GPP TS 24.301.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, in an aspect, a wireless communications system 100 includes at least one UE 12 in communication coverage of at least one TRP 14 or TRP 20 (e.g., a network entity, base station, or gNB or eNB, or a cell, or a distributed unit (DU) associated with a gNB thereof). The UE 12 may communicate with a core network 160 (e.g., 5G core network) via the TRP 14 and/or TRP 20 for IP services 176. The TRP 14 and TRP 20 may interface with the core network 160 through backhaul links 132 (e.g., S1, etc.) which may be wired or wireless communication links. The TRP 14 and TRP 20 may perform radio configuration and scheduling for communications with the UEs 12. In various examples, the TRP 14 and TRP 20 may communicate either directly or indirectly (e.g., through core network 160), with one another over backhaul links 132 (e.g., X1, X2, Xn, etc.), which may be wired or wireless communication links. In some aspects, TRPs may communicate to a central unit (CU) associated with a gNB, or a central scheduler in radio access network (RAN). In some aspects, multiple UEs including UE 12 may be in communication coverage with one or more network entities, including TRP 14 and TRP 20, both of which are shown in a CoMP cluster set 24. In an aspect, the TRP 14 and/or TRP 20 may be a network entity, such as a base station or an eNodeB/eNB in a long term evolution (LTE) network. Although various aspects are described in relation to a UMTS, LTE, or 5G NR networks, similar principles may be applied in other wireless wide area networks (WWAN). The wireless network may employ a scheme where multiple TRPs 14/20 may communicate with the UE 12 on a channel or respective channels. In an example, UE 12 may transmit and/or receive wireless communications to and/or from TRP 14 and/or TRP 20. For example, the UE 12 may be actively communicating with TRP 14 and/or TRP 20.

In some aspects, the UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communications device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. The TRP 14 or TRP 20 may be a macrocell, picocell, femtocell, relay, Node B, mobile Node B, small cell box, UE (e.g., communicating in peer-to-peer or ad-hoc mode with UE 12), or substantially any type of component that may communicate with UE 12 to provide wireless network access at the UE 12.

According to the present aspects, the TRP 14/20 may include one or more processors 103 and a memory 130 that may operate in combination with a CoMP management component 40 to control a UE CoMP management component 42 and/or a TRP CoMP management component 44 for determining a CoMP cluster set and coordinate communications for the UE 12 using the CoMP cluster set. For example, the UE CoMP management component 42 may determine a CoMP cluster set 24 and may adjust the CoMP cluster set 24 for the UE 12. The CoMP cluster set 24 may be based on configuration information and measurements, delay budget or reliability requirement for the UE 12. An adjustment to the CoMP cluster set 24 may be based on one or more of number of allowed subsequent re-transmissions to the UE 12, configuration information and measurements, delay budget or reliability requirement. The configuration information and measurements may include current channel measurements or current channel measurements and long term channel measurements. The channel measurements may include one or more of past path loss, channel state information (CSI), synchronization signal measurements or reference signal measurements associated with the UE 12. The CSI may include one or more of channel quality indicator (CQI), precoding matrix indicator (PMI), precoding type indicator (PTI) or rank indication (RI). The synchronization signal measurements may include primary synchronization signal (PSS) measurements and/or secondary synchronization signal (SSS) measurements. The reference signal measurements may include one or more of reference signal receive power (RSRP), received signal strength indicator (RSSI), reference signal received quality (RSRQ) or any other reference signal measurements. The delay budget may be a maximum amount of time for transmission of a packet, including re-transmissions. For example, the URLLC delay budgets may be approximately 0.5-10 ms. The delay budget may be based on one or more of end-to-end latency requirements, jitter requirements, round-trip-time requirements, or survival time requirements. See e.g., 3GPP TS 22.261. The reliability requirement may be a likelihood that a transmitted packet is received correctly. The reliability requirement may be based on one or more of a packet error rate (PER) requirement or communication service availability. See e.g., 3GPP TS 22.261. The reliability requirement may be based on, on a per packet basis, one or more of a survival time associated with a radio bearer used for communication, number of packet errors of one or more preceding packets or number of consecutive packet errors in preceding packets. In another example, the TRP CoMP management component 44 may coordinate communications for the UE 12 using the CoMP cluster set 24.

In an aspect, the term "component" as used herein may be one of the parts that make up a system, may be hardware, firmware, and/or software, and may be divided into other components. The CoMP management component 40 may be communicatively coupled with a transceiver 106, which may include a receiver 32 for receiving and processing RF signals and a transmitter 34 for processing and transmitting RF signals. The CoMP management component 40 may include the UE CoMP management component 42 and/or the TRP CoMP management component 44 for determining CoMP cluster sets and/or coordinating communication for the UE 12 using one of the CoMP cluster sets. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by the UE 12, TRP 14 and/or TRP 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the CoMP management component 40 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the CoMP management component 40, including the UE CoMP management component 42 and/or the TRP CoMP management component 44.

The CoMP management component 40, UE CoMP management component 42 and/or TRP CoMP management component 44 may include hardware, firmware, and/or software code executable by a processor for performing determining a CoMP cluster set of TRPs 24 for a UE 12 and coordinating communications for the UE 12 using the CoMP cluster set of TRPs 24. For example, the hardware may include, for example, a hardware accelerator, or specialized processor.

Moreover, in an aspect, the TRP 14/20 may include RF front end 104 and transceiver 106 for receiving and transmitting radio transmissions, for example, wireless communications 26. For example, transceiver 106 may transmit or receive a signal that includes a pilot signal (e.g., common pilot channel (CPICH)). The transceiver 106 may measure the received pilot signal in order to determine signal quality and for providing feedback to the TRP 14/20. For example, transceiver 106 may communicate with modem 108 to transmit messages generated by CoMP management component 40 and to receive messages and forward them to CoMP management component 40.

RF front end 104 may be connected to one or more antennas 102 and may include one or more low-noise amplifiers (LNAs) 141, one or more switches 142, 143, one or more power amplifiers (PAs) 145, and one or more filters 144 for transmitting and receiving RF signals. In an aspect, components of RF front end 104 may connect with transceiver 106. Transceiver 106 may be communicatively couple with one or more modems 108 and processor 103.

In an aspect, LNA 141 may amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the CoMP management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 may be used by RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through one or more antennas 102 via RF front end 104. In an aspect, transceiver may be tuned to operate at specified frequencies such that TRP 14/20 may communicate with, for example, UE 12. In an aspect, for example, modem 108 may configure transceiver 106 to operate at a specified frequency and power level based on the TRP configuration of the TRP and communication protocol used by modem 108.

In an aspect, modem 108 may be a multiband-multimode modem, which may process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components of TRP 14/20 (e.g., RF front end 104, transceiver 106) to enable transmission and/or reception of signals based on a specified modem configuration. In an aspect, the modem configuration may be based on the mode of the modem and the frequency band in use. In another aspect, the modem configuration may be based on UE configuration information associated with UE 12 as provided by the network during cell selection and/or cell reselection.

TRP 14 or TRP 20 may further include memory 130, such as for storing data used herein and/or local versions of applications or CoMP management component 40 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining CoMP management component 40 and/or one or more of its subcomponents, and/or data associated therewith, when TRP 14 or TRP 20 is operating processor 103 to execute CoMP management component 40 and/or one or more of its subcomponents. In another aspect, for example, memory 130 may be a non-transitory computer-readable storage medium.

Figure 2A:
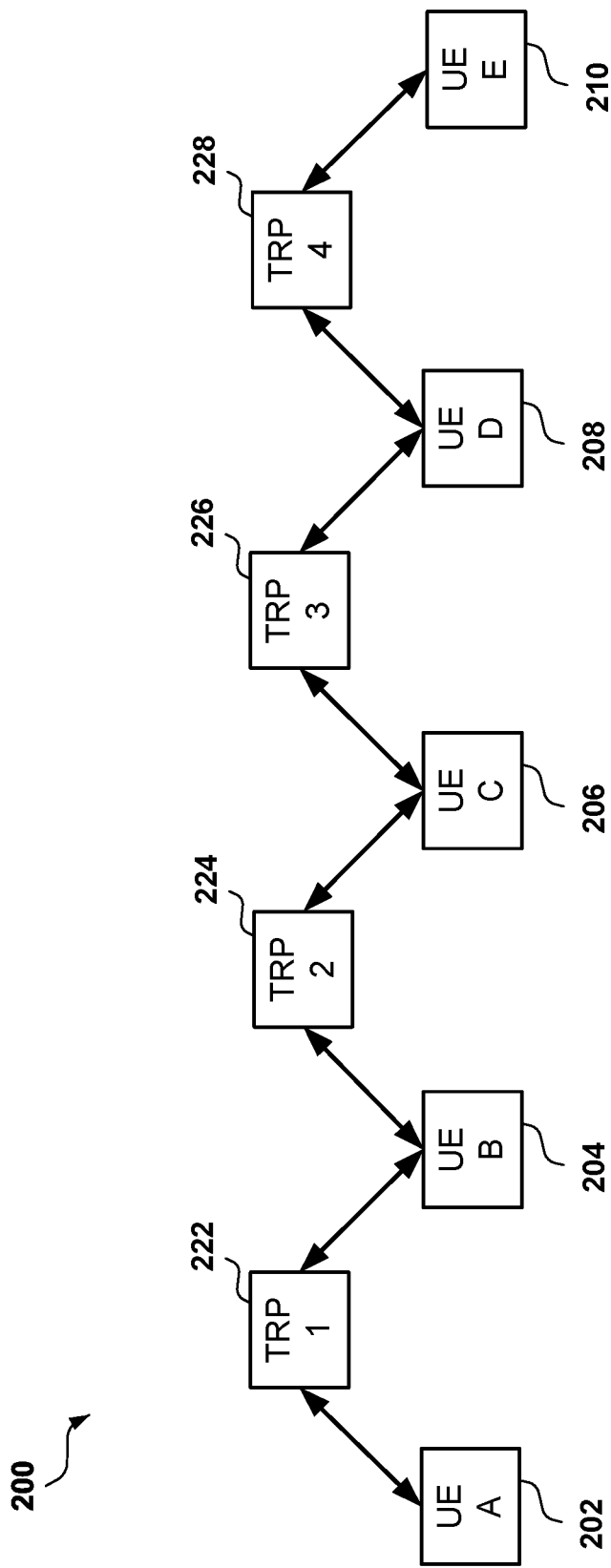
FIG. 2A is a diagram of an example communications network with a UE having a CoMP cluster set of two TRPs for the UE, according to one or more of the presently described aspects.
Figure 2B:
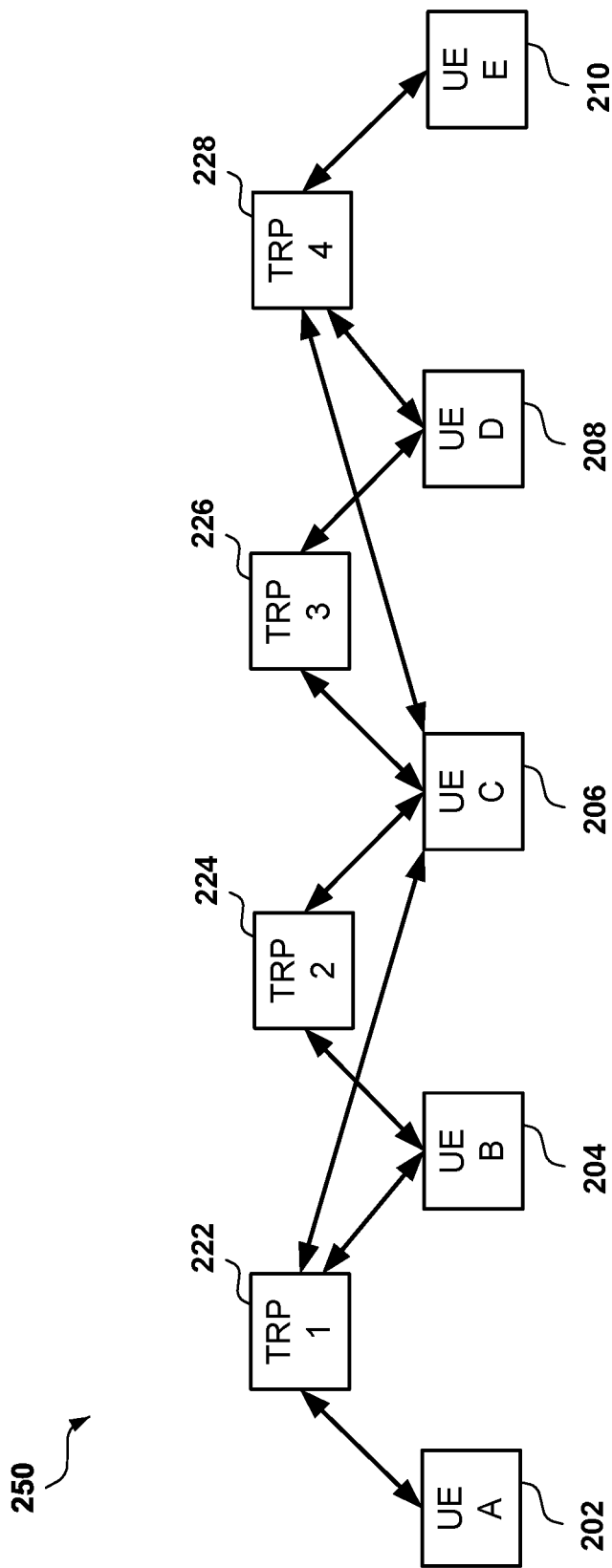
FIG. 2B is a diagram of an example communications network with a UE having a CoMP cluster set of four TRPs for the UE, according to one or more of the presently described aspects.

Referring to FIGS. 2A and 2B, diagrams of example communications networks with a UE having different CoMP cluster sets are illustrated. For example, in FIG. 2A, UE C 206 is in a cluster set with TRP 2 224 and TRP 3 226. Similarly, UE B 204 is in a cluster set with TRP 1 222 and TRP 2 224 and UE D 208 is in a cluster set with TRP 3 226 and TRP 4 228. In FIG. 2B, UE C 204 is in a cluster set with TRP 1 222, TRP 2 224, TRP 3 226 and TRP 4 228. UE B 204 and UE D 208 are in the same cluster sets as shown in FIG. 2A.

In determining clusters in a conventional communications network, clusters may be determined using long term channel statistics such as averaged path loss or averaged RSRP. However, such clusters may not meet the delay budgets and reliability requirements that URLLC services or other services require. For example, URLLC requires packet error rates (PER) of $10^{-5}$ or $10^{-6}$ with very low latency, e.g., 0.5-10 ms. For URLLC, HARQ procedures and CoMP schemes are important in order to achieve or meet URLLC requirements. For example, due to the low latency requirements of URLLC, the number of HARQ re-transmissions may be limited. In order to achieve or meet URLLC reliability requirements in CoMP schemes, UE-centric clustering is preferred over TRP centric clustering. In TRP-centric clustering or network-centric clustering, TRPs are clustered where all of the UEs within the serving area of the clustered TRPs are served by all of the TRPs or a sub-group of TRPs in the cluster. Network-centric clustering is less complex compared to UE-centric clustering, especially from a scheduling point of view, but UEs at the cluster edge suffer from inter-cluster interference. In UE-centric clustering, UEs are allocated their own cluster of TRPs individually. Although this clustering method may provide better signal-to-interference-plus notice (SINR) gains, this clustering method requires higher backhaul capacity and is more complex, especially in terms of scheduling and precoding design where UE clusters overlap with each other. To reduce complexity, UE-centric clustering may be implemented in small groups of TRPs rather than the whole network. In UE-centric clustering, the M strongest TRPs may be used to form the CoMP cluster set for a given UE.

To form a CoMP cluster set in URLLC, delay budgets and reliability requirements may be used to determine a CoMP cluster set. In an aspect, if a delay budget is considered to be relatively very small (below a threshold, e.g., 1 ms330) and the reliability requirement is considered to be relatively stringent (below a threshold, e.g., $10^{-6}$ PER), a CoMP cluster set may be formed based on the delay budget and reliability requirement. In an aspect, if a delay budget is considered to be relatively moderate (above a threshold, e.g., 5 ms) and the reliability requirement is considered to be relatively very stringent (below a threshold, $10^{-8}$ PER), a smaller cluster may be formed based on the delay budget and reliability requirement. For example, FIG. 2A shows an example of a cluster set of two TRPs (e.g., TRP 2 224 and TRP 3 226) for UE C 206 having a relaxed delay budget of 10 ms and a moderate reliability requirement of $10^{-5}$ PER. In another example, FIG. 2B shows an example of a cluster set of four TRPs (e.g., TRP 1 222, TRP 2 224, TRP 3 226 and TRP 4 228). Hence, a small delay budget requires larger cluster size and a smaller error rate typically requires a larger cluster size.

The cluster size (e.g., number of TRPs in a CoMP cluster set 24) may be adjusted based on the number of allowed re-transmissions. In an aspect, a reliability requirement for a first transmission and each re-transmission is computed based on the overall reliability requirement and number of allowed subsequent re-transmissions within the remaining delay budget. The remaining delay budget for a re-transmission may be determined by subtracting, from the delay budget, time used for any preceding first transmission and re-transmission associated with the re-transmission. The number of allowed subsequent re-transmissions within the remaining delay budget may be determined based on one or more of slot structure, UE processing delays, TRP processing delays, backhaul latency, etc. In an example, if the maximum of two remaining re-transmissions is possible within the remaining delay budget, a less stringent reliability requirement for current transmissions may be used given that two more chances for re-transmissions are available. In another example, if no re-transmissions are available because the current transmission is very close to the delay budget, a very stringent reliability requirement for the current transmissions may be used. Thus in these two examples, the cluster size for the first example would be smaller than the cluster size for the second example because the second example ensures that current transmissions are able to meet the more stringent reliability requirement, without allowing for re-transmissions, by using a larger CoMP cluster set 24. By using the larger CoMP cluster set 24, the UE 12 has a higher probability of receiving a packet from one of the TRPs in the CoMP cluster set 24.

Figure 3:
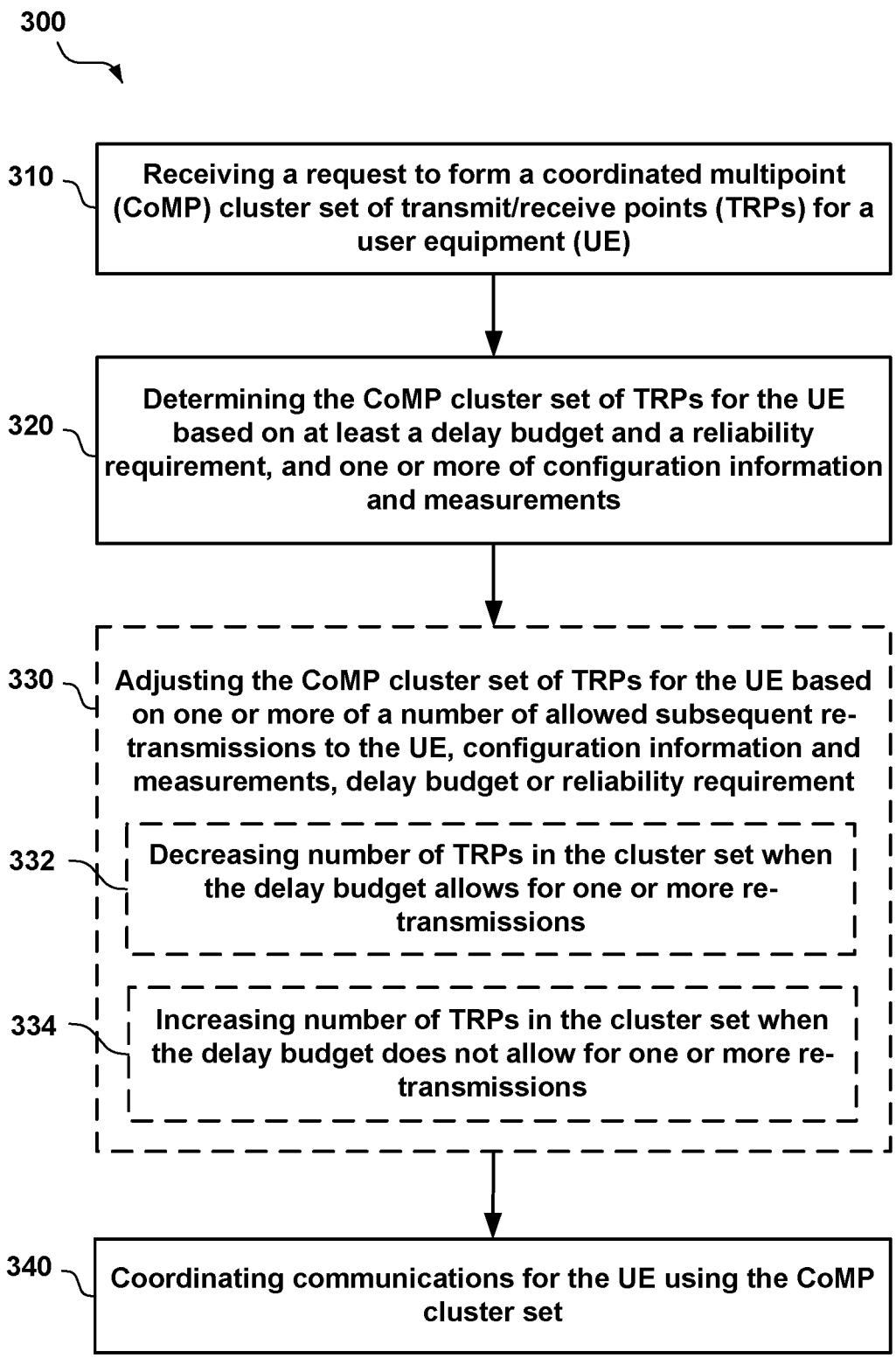
FIG. 3 is a flow diagram of an example method for determining a CoMP cluster set based on reliability and delay budget, according to one or more of the presently described aspects.

Referring to FIG. 3, in an operational aspect, a network entity, such as TRP 14 or TRP 20, may perform one or more aspects of a method 300 for determining a CoMP cluster set. For example, one or more of the processors 103, the memory 130, the modem 108, the transceiver 106 (including the receiver 32 and/or the transmitter 34), the CoMP management component 40, and/or at least one of the sub-components of the CoMP management component 40 may be configured to perform one or more aspects of the method 300.

In an aspect, at block 310, the method 300 may include receiving a request to form a CoMP cluster set of TRPs for a UE. In an aspect, for example, the CoMP management component 40 and/or the UE CoMP management component 42, e.g., in conjunction with one or more of the processors 103, the memory 130, the modem 108, and/or the transceiver 106, may receive a request to form a CoMP cluster set of TRPs 24 for a UE 12. The request may be received from one or more of the UE 12, TRP 14, TRP 20, entity in a RAN, central unit, distributed unit, entity in a core network 160, or an operations and management (OAM) entity.

In an aspect, at block 320, the method 300 may include determining the CoMP cluster set of TRPs for the UE based on at least a delay budget and a reliability requirement, and one or more of configuration information and measurements. In an aspect, for example, the CoMP management component 40 and/or the UE CoMP management component 42, e.g., in conjunction with one or more of the processors 103, the memory 130, the modem 108, and/or the transceiver 106, may determine the CoMP cluster set of TRPs 24 for the UE 12 based on at least the delay budget and the reliability requirement, and one or more of configuration information and measurements. The delay budget may be based on one or more of end-to-end latency requirements, jitter requirements, round-trip-time requirements or survival time requirements. The reliability requirement is based on a PER requirement and/or communication service availability requirement. The reliability requirement may be based one or more of a survival time associated with a radio bearer used for communication, number of packet errors one or more preceding packets or number of consecutive packet errors in preceding packets. The configuration information and measurements may include current channel measurements or current channel measurements and long term channel measurements. The channel measurements may include one or more of past path loss, channel state information (CSI), synchronization signal measurements or reference signal measurements associated with the UE 12.

In an aspect, at block 330, the method 300 may optionally include adjusting the CoMP cluster set of TRPs for the UE based on one or more of a number of allowed subsequent re-transmissions to the UE, configuration information and measurements, delay budget or reliability requirement. In an aspect, for example, the CoMP management component 40 and/or the UE CoMP management component 42, e.g., in conjunction with one or more of the processors 103, the memory 130, the modem 108, and/or the transceiver 106, may adjust the CoMP cluster set of TRPs 24 for the UE 12 based on one or more of a number of allowed subsequent re-transmissions to the UE 12, configuration information and measurements, delay budget or reliability requirement. The adjustment of the CoMP cluster set of TRPs 24 may be based on one or more of a slot structure, UE processing delays, TRP processing delays or backhaul latency. In an aspect, at block 332, the method 300 may optionally include decreasing the number of TRPs in the cluster set when the delay budget allows for one or more re-transmissions. In an aspect, for example, the CoMP management component 40 and/or UE CoMP management component 42, e.g., in conjunction with one or more of the processors 103, the memory 130, the modem 108, and/or the transceiver 106, may decrease the number of TRPs in the cluster set 24 when the delay budget allows for one or more re-transmissions. In an aspect, at block 334, the method 300 may optionally include increasing the number of TRPs in the cluster set when the delay budget does not allow for one or more re-transmissions. In an aspect, for example, the CoMP management component 40 and/or the UE CoMP management component 42, e.g., in conjunction with one or more of the processors 103, the memory 130, the modem 108, and/or the transceiver 106, may increase the number of TRPs in the cluster set 24 when the delay budget does not allow for one or more re-transmissions.

In an aspect, at block 340, the method 300 may include coordinating communications for the UE using the CoMP cluster set. In an aspect, for example, the CoMP management component 40 and/or the TRP CoMP management component 44, e.g., in conjunction with one or more of the processors 103, the memory 130, the modem 108, and/or the transceiver 106, may coordinate communications for the UE 12 using the CoMP cluster set 24. In an aspect, the network entity, such as TRP 14 or TRP 20, may coordinate with the other TRPs in the CoMP cluster set 24 to communicate the same packet to the UE 12. For example, all of the TRPs in the CoMP cluster set 24 may transmit the same packet to the UE 12. In another example, all of the TRPs in the CoMP cluster set may receive the same packet from the UE 12. The coordinating of the communications may be done by one of the TRPs, e.g., the master TRP, or alternatively by a network entity, such as a controller. The coordination may be done through the backhaul links 132 or via the core network 160.

Figure 4:
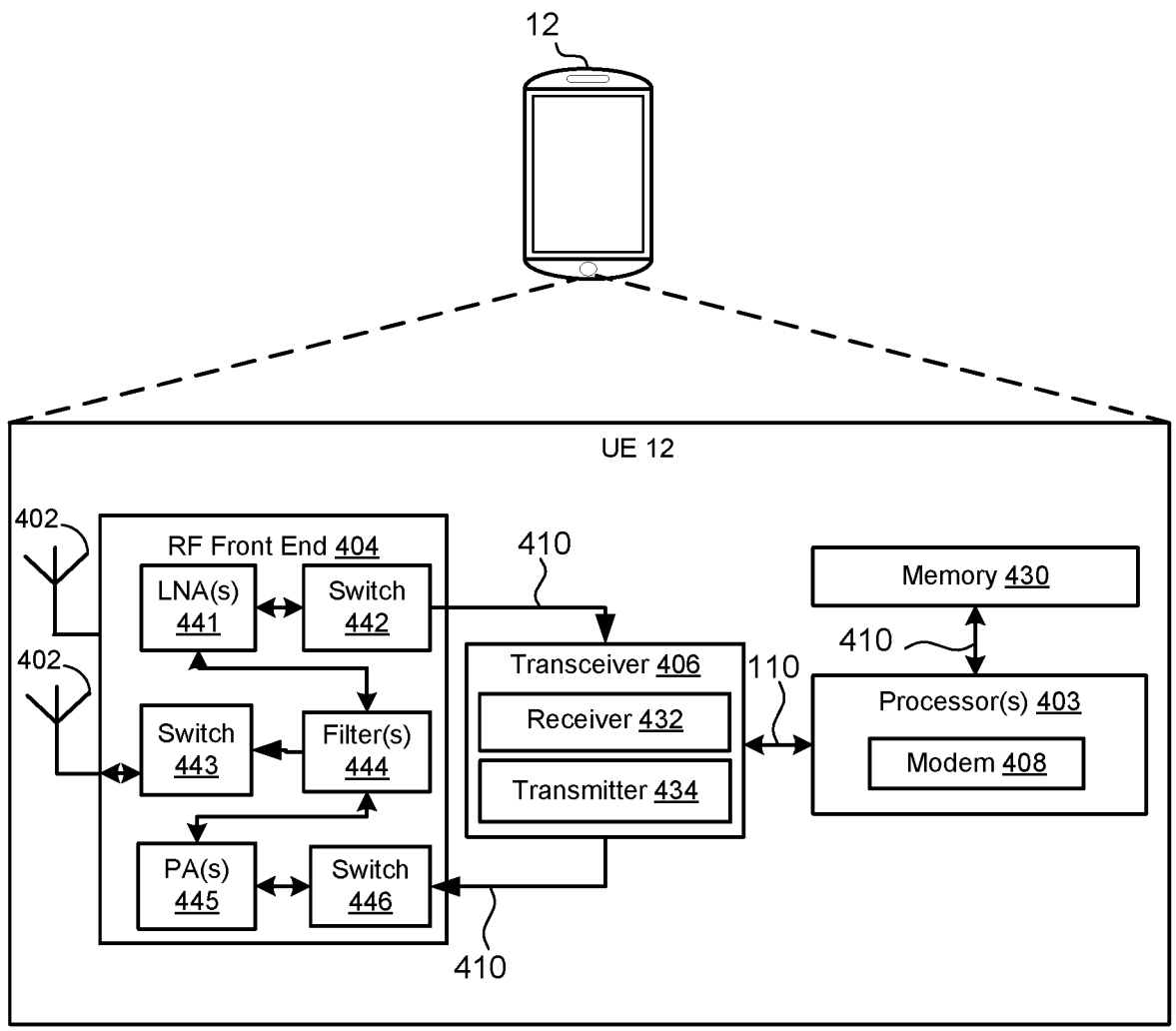
FIG. 4 is a schematic diagram of example components of the UE of FIG. 1, according to one or more of the presently described aspects.

Referring to FIG. 4, one example of an implementation of UE 12 may include a variety of components, some of which have already been described above, but including components such as one or more processors 403 and memory 430 and transceiver 406 in communication via one or more buses 410, which may operate in conjunction with modem 408 to enable one or more of the functions described herein related to coordinated communications of a UE 12 with a CoMP cluster set of TRPs 24.

The transceiver 406, receiver 432, transmitter 434, one or more processors 403, memory 430, buses 410, RF front end 404, LNAs 441, switches 443, filters 444, PAs 445, and one or more antennas 402 may be the same as or similar to the corresponding components of TRP 14/20, as described above, but configured or otherwise programmed for UE operations as opposed to TRP operations.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Some Further Example Embodiments

An example method for wireless communications comprising: receiving a request to form a coordinated multi-point (CoMP) cluster set of transmit/receive points (TRPs) for a user equipment (UE); determining the CoMP cluster set of TRPs for the UE based on at least a delay budget and a reliability requirement, and one or more of configuration information and measurements; and coordinating communications for the UE using the CoMP cluster set.

The above example method, wherein the request is received from one or more of the UE, TRP, entity in a radio access network (RAN), central unit, distributed unit, entity in a core network or an operations and management (OAM) entity.

One or more of the above example methods, wherein the delay budget is based on one or more of end-to-end latency requirements, jitter requirements, round-trip-time requirements or survival time requirements.

One or more of the above example methods, wherein the reliability requirement is based on one or more of packet error rate (PER) requirement or communication service availability requirement.

One or more of the above example methods, wherein the reliability requirement is based on, on a per packet basis, one or more of a survival time associated with a radio bearer used for communication, number of packet errors of one or more preceding packets or number of consecutive packet errors in preceding packets.

One or more of the above example methods, further comprising adjusting the CoMP cluster set of TRPs based on one or more of a number of allowed subsequent re-transmissions to the UE, configuration information and measurements, delay budget or reliability requirement.

The above example methods, wherein the CoMP cluster set of TRPs is determined using an adjustment based on one or more of a slot structure, UE processing delays, TRP processing delays or backhaul latency.

The above example methods, wherein the adjustment is a decrease in number of TRPs in the CoMP cluster set when the delay budget allows for one or more subsequent re-transmissions or wherein the adjustment is an increase in number of TRPs in the CoMP cluster set when the delay budget does not allow for one or more subsequent re-transmissions.

One or more of the above example methods, further comprising adjusting the CoMP cluster set of TRPs based on one or more of a number of allowed subsequent re-transmissions to the UE, configuration information, or measurements, delay budget or reliability requirement and wherein the configuration information and measurements includes one or more of current channel measurements or long term channel measurements, wherein the current channel measurements include one or more of path loss, channel state information (CSI), synchronization signal measurements or reference signal measurements associated with the UE, and wherein the long term channel measurements include one or more of past path loss, channel state information (CSI), synchronization signal measurements or reference signal measurements associated with the UE.

The above example methods, wherein the CSI includes one or more of a channel quality indicator (CQI), precoding matrix indicator (PMI), precoding type indicator (PTI), or rank indication (RI) and/or wherein the synchronization signal measurements include one or more of Primary Synchronization Signal (PSS) measurements or Secondary Synchronization Signal (SSS) measurements and/or wherein the reference signal measurements include one or more of reference signal received power (RSRP) measurements, reference signal received quality (RSRQ) measurements or received signal strength indicator (RSSI).

An example network entity for wireless communications comprising: a memory; and a processor communicatively coupled with the memory and configured to: receive a request to form a coordinated multi-point (CoMP) cluster set of transmit/receive points (TRPs) for a user equipment (UE); determine the CoMP cluster set of TRPs for the UE based on at least a delay budget and a reliability requirement, and one or more of configuration information and measurements; and coordinate communications for the UE using the CoMP cluster set.

The above example network entity, wherein the request is received from one or more of the UE, TRP, entity in a radio access network (RAN), central unit, distributed unit, entity in a core network or an operations and management (OAM) entity.

One or more of the above example network entities, wherein the delay budget is based on one or more of end-to-end latency requirements, jitter requirements, round-trip-time requirements or survival time requirements.

One or more of the above example network entities, wherein the reliability requirement is based on one or more of packet error rate (PER) requirement or communication service availability requirement.

One or more of the above example network entities, wherein the reliability requirement is based on, on a per packet basis, one or more of a survival time associated with a radio bearer used for communication, number of packet errors of one or more preceding packets or number of consecutive packet errors in preceding packets.

One or more of the above example network entities, wherein the processor is configured to adjust the CoMP cluster set of TRPs based on one or more of a number of allowed subsequent re-transmissions to the UE, configuration information and measurements, or delay budget and reliability requirement.

The above example network entities, wherein the CoMP cluster set of TRPs is determined using an adjustment based on one or more of a slot structure, UE processing delays, TRP processing delays or backhaul latency.

The above example network entities, wherein the adjustment is a decrease in number of TRPs in the CoMP cluster set when the delay budget allows for one or more subsequent re-transmissions or wherein the adjustment is an increase in number of TRPs in the CoMP cluster set when the delay budget does not allow for one or more subsequent re-transmissions.

One or more of the above example network entities, wherein the processor is configured to adjust the CoMP cluster set of TRPs based on one or more of a number of allowed subsequent re-transmissions to the UE, configuration information and measurements, or delay budget and reliability requirement and wherein the configuration information and measurements includes one or more of current channel measurements or long term channel measurements, wherein the current channel measurements include one or more of path loss, channel state information (CSI), synchronization signal measurements or reference signal measurements associated with the UE, and wherein the long term channel measurements include one or more of past path loss, channel state information (CSI), synchronization signal measurements or reference signal measurements associated with the UE.

The above example network entities, wherein the CSI includes one or more of a channel quality indicator (CQI), precoding matrix indicator (PMI), precoding type indicator (PTI), or rank indication (RI) and/or wherein the synchronization signal measurements include one or more of Primary Synchronization Signal (PSS) measurements or Secondary Synchronization Signal (SSS) measurements and/or wherein the reference signal measurements include one or more of reference signal received power (RSRP) measurements, reference signal received quality (RSRQ) measurements or received signal strength indicator (RSSI).

An example non-transitory computer-readable medium storing computer-executable code that when executed by a processor of a network entity causes the processor to: receive a request to form a coordinated multi-point (CoMP) cluster set of transmit/receive points (TRPs) for a user equipment (UE); determine the CoMP cluster set of TRPs for the UE based on at least a delay budget and a reliability requirement, and one or more of configuration information and measurements; and coordinate communications for the UE using the CoMP cluster set.

The above example non-transitory computer-readable medium, wherein the request is received from one or more of the UE, TRP, entity in a radio access network (RAN), central unit, distributed unit, entity in a core network or an operations and management (OAM) entity.

One or more of the above example non-transitory computer-readable mediums, wherein the delay budget is based on one or more of end-to-end latency requirements, jitter requirements, round-trip-time requirements or survival time requirements.

One or more of the above example non-transitory computer-readable mediums, wherein the reliability requirement is based on one or more of packet error rate (PER) requirement or communication service availability requirement.

One or more of the above example non-transitory computer-readable mediums, wherein the reliability requirement is based on, on a per packet basis, one or more of a survival time associated with a radio bearer used for communication, number of packet errors of one or more preceding packets or number of consecutive packet errors in preceding packets.

One or more of the above example non-transitory computer-readable mediums, where the code further causes the processor to adjust the CoMP cluster set of TRPs based on one or more of a number of allowed subsequent re-transmissions to the UE, configuration information and measurements, delay budget or reliability requirement.

The above example non-transitory computer-readable mediums, wherein the CoMP cluster set of TRPs is determined using an adjustment based on one or more of a slot structure, UE processing delays, TRP processing delays or backhaul latency.

The above example non-transitory computer-readable mediums, wherein the adjustment is a decrease in number of TRPs in the CoMP cluster set when the delay budget allows for one or more subsequent re-transmissions or wherein the adjustment is an increase in number of TRPs in the CoMP cluster set when the delay budget does not allow for one or more subsequent re-transmissions.

One or more of the example non-transitory computer-readable mediums, where the code further causes the processor to adjust the CoMP cluster set of TRPs based on one or more of a number of allowed subsequent re-transmissions to the UE, configuration information, or measurements, delay budget or reliability requirement and wherein the configuration information and measurements includes one or more of current channel measurements or long term channel measurements, wherein the current channel measurements include one or more of path loss, channel state information (CSI), synchronization signal measurements or reference signal measurements associated with the UE, and wherein the long term channel measurements include one or more of past path loss, channel state information (CSI), synchronization signal measurements or reference signal measurements associated with the UE.

The above example non-transitory computer-readable mediums, wherein the CSI includes one or more of a channel quality indicator (CQI), precoding matrix indicator (PMI), precoding type indicator (PTI), or rank indication (RI) and/or wherein the synchronization signal measurements include one or more of Primary Synchronization Signal (PSS) measurements or Secondary Synchronization Signal (SSS) measurements and/or wherein the reference signal measurements include one or more of reference signal received power (RSRP) measurements, reference signal received quality (RSRQ) measurements or received signal strength indicator (RSSI).

A second example network entity for wireless communications comprising: means for receiving a request to form a coordinated multi-point (CoMP) cluster of transmit/receive points (TRPs) for a user equipment (UE); means for determining the CoMP cluster set of TRPs for the UE based on at least a delay budget and a reliability requirement, and one or more of configuration information and measurements; and means for coordinating communications for the UE using the CoMP cluster set.

The above example network entity, wherein the request is received from one or more of the UE, TRP, entity in a radio access network (RAN), central unit, distributed unit, entity in a core network or an operations and management (OAM) entity.

One or more of the above example network entities, wherein the delay budget is based on one or more of end-to-end latency requirements, jitter requirements, round-trip-time requirements or survival time requirements.

One or more of the above example network entities, wherein the reliability requirement is based on one or more of packet error rate (PER) requirement or communication service availability requirement.

One or more of the above example network entities, wherein the reliability requirement is based on, on a per packet basis, one or more of a survival time associated with a radio bearer used for communication, number of packet errors of one or more preceding packets or number of consecutive packet errors in preceding packets.

One or more of the above example network entities, further comprising means for adjusting the CoMP cluster set of TRPs based on one or more of a number of allowed subsequent re-transmissions to the UE, configuration information and measurements, or delay budget and reliability requirement.

The above example network entities, wherein the CoMP cluster set of TRPs is determined using an adjustment based on one or more of a slot structure, UE processing delays, TRP processing delays or backhaul latency.

The above example network entities, wherein the adjustment is a decrease in number of TRPs in the CoMP cluster set when the delay budget allows for one or more subsequent re-transmissions or wherein the adjustment is an increase in number of TRPs in the CoMP cluster set when the delay budget does not allow for one or more subsequent re-transmissions.

One or more of the above example network entities, further comprising means for adjusting the CoMP cluster set of TRPs based on one or more of a number of allowed subsequent re-transmissions to the UE, configuration information and measurements, or delay budget and reliability requirement and wherein the configuration information and measurements includes one or more of current channel measurements or long term channel measurements, wherein the current channel measurements include one or more of path loss, channel state information (CSI), synchronization signal measurements or reference signal measurements associated with the UE, and wherein the long term channel measurements include one or more of past path loss, channel state information (CSI), synchronization signal measurements or reference signal measurements associated with the UE.

The above example network entities, wherein the CSI includes one or more of a channel quality indicator (CQI), precoding matrix indicator (PMI), precoding type indicator (PTI), or rank indication (RI) and/or wherein the synchronization signal measurements include one or more of Primary Synchronization Signal (PSS) measurements or Secondary Synchronization Signal (SSS) measurements and/or wherein the reference signal measurements include one or more of reference signal received power (RSRP) measurements, reference signal received quality (RSRQ) measurements or received signal strength indicator (RSSI).

What is claimed is:

1. A method for wireless communications comprising:
   receiving, from a user equipment (UE), a request to form a coordinated multi-point (CoMP) cluster set of transmit/receive points (TRPs) for the UE;
   in response to receiving the request to form a CoMP cluster set of TRPs for the UE, determining the CoMP cluster set of TRPs for the UE based on at least a delay budget and a reliability requirement, and one or more of configuration information and measurements in addition to the delay budget and the reliability requirement, wherein the configuration information and measurements includes one or more of current channel measurements or long term channel measurements, wherein the one or more current channel measurements or long term channel measurements include one or more of path loss, channel state information (CSI), synchronization signal measurements or reference signal measurements associated with the UE; and
   coordinating communications for the UE using the CoMP cluster set.

2. The method of claim 1, wherein the request is received from one or more of the UE, TRP, entity in a radio access network (RAN), central unit, distributed unit, entity in a core network or an operations and management (OAM) entity.

3. The method of claim 1, wherein the delay budget is based on one or more of end-to-end latency requirements, jitter requirements, round-trip-time requirements or survival time requirements.

4. The method of claim 1, wherein the reliability requirement is based on one or more of packet error rate (PER) requirement or communication service availability requirement.

5. The method of claim 1, wherein the reliability requirement is based on, on a per packet basis, one or more of a survival time associated with a radio bearer used for communication, number of packet errors of one or more preceding packets or number of consecutive packet errors in preceding packets.

6. The method of claim 1, further comprising:
   adjusting the CoMP cluster set of TRPs based on one or more of a number of allowed subsequent re-transmissions to the UE, configuration information and measurements, delay budget or reliability requirement.

7. The method of claim 6, wherein the CoMP cluster set of TRPs is determined using an adjustment based on one or more of a slot structure, UE processing delays, TRP processing delays or backhaul latency.

8. The method of claim 7, wherein the adjustment is a decrease in number of TRPs in the CoMP cluster set when the delay budget allows for one or more subsequent re-transmissions.

9. The method of claim 7, wherein the adjustment is an increase in number of TRPs in the CoMP cluster set when the delay budget does not allow for one or more subsequent re-transmissions.

10. The method of claim 1, wherein the CSI includes one or more of a channel quality indicator (CQI), precoding matrix indicator (PMI), precoding type indicator (PTI), or rank indication (RI).

11. The method of claim 1, wherein the synchronization signal measurements include one or more of Primary Synchronization Signal (PSS) measurements or Secondary Synchronization Signal (SSS) measurements.

12. The method of claim 1, wherein the reference signal measurements include one or more of reference signal received power (RSRP) measurements, reference signal received quality (RSRQ) measurements or received signal strength indicator (RSSI).

13. A network entity for wireless communications comprising:
    a memory; and
    a processor communicatively coupled with the memory and configured to:
      receive, from a user equipment (UE), a request to form a coordinated multi-point (CoMP) cluster set of transmit/receive points (TRPs) for the UE;
      in response to receiving the request to form a CoMP cluster set of TRPs for the UE, determine the CoMP cluster set of TRPs for the UE based on at least a delay budget and a reliability requirement, and one or more of configuration information and measurements in addition to the delay budget and the reliability requirement, wherein the configuration information and measurements includes one or more of current channel measurements or long term channel measurements, wherein the one or more current channel measurements or long term channel measurements include one or more of path loss, channel state information (CSI), synchronization signal measurements or reference signal measurements associated with the UE; and
      coordinate communications for the UE using the CoMP cluster set.

14. The network entity of claim 13, wherein the request is received from one or more of the UE, TRP, entity in a radio access network (RAN), central unit, distributed unit, entity in a core network or an operations and management (OAM) entity.

15. The network entity of claim 13, wherein the delay budget is based on one or more of end-to-end latency requirements, jitter requirements, round-trip-time requirements or survival time requirements.

16. The network entity of claim 13, wherein the reliability requirement is based on one or more of packet error rate (PER) requirement or communication service availability requirement.

17. The network entity of claim 13, wherein the reliability requirement is based on, on a per packet basis, one or more of a survival time associated with a radio bearer user for communication, number of packet errors of one or more preceding packets or number of consecutive packet errors in preceding packets.

18. The network entity of claim 13, wherein the processor is configured to:
    adjust the CoMP cluster set of TRPs based on one or more of a number of allowed subsequent re-transmissions to the UE, configuration information and measurements, delay budget or reliability requirement.

19. The network entity of claim 18, wherein the CoMP cluster set of TRPs is determined using an adjustment based on one or more of a slot structure, UE processing delays, TRP processing delays or backhaul latency.

20. The network entity of claim 19, wherein the adjustment is a decrease in number of TRPs in the CoMP cluster set when the delay budget allows for one or more subsequent re-transmissions.

21. The network entity of claim 19, wherein the adjustment is an increase in number of TRPs in the CoMP cluster set when the delay budget does not allow for one or more subsequent re-transmissions.

22. The network entity of claim 13, wherein the CSI includes one or more of a channel quality indicator (CQI), precoding matrix indicator (PMI), precoding type indicator (PTI), or rank indication (RI).

23. The network entity of claim 13, wherein the synchronization signal measurements include one or more of Primary Synchronization Signal (PSS) measurements or Secondary Synchronization Signal (SSS) measurements.

24. The network entity of claim 13, wherein the reference signal measurements include one or more of reference signal received power (RSRP) measurements, reference signal received quality (RSRQ) measurements or received signal strength indicator (RSSI).

25. The network entity of claim 13, wherein:
the CSI includes one or more of a channel quality indicator (CQI), precoding matrix indicator (PMI), precoding type indicator (PTI), or rank indication (RI);
the synchronization signal measurements include one or more of Primary Synchronization Signal (PSS) measurements or Secondary Synchronization Signal (SSS) measurements; and
the reference signal measurements include one or more of reference signal received power (RSRP) measurements, reference signal received quality (RSRQ) measurements or received signal strength indicator (RSSI).

26. A non-transitory computer-readable medium storing computer-executable code that when executed by a processor of a network entity cause the processor to:
receive, from a user equipment, a request to form a coordinated multi-point (CoMP) cluster set of transmit/receive points (TRPs) for the UE;
in response to receiving the request to form a CoMP cluster set of TRPs for the UE, determine the CoMP cluster set of TRPs for the UE based on at least a delay budget and a reliability requirement, and one or more of configuration information and measurements in addition to the delay budget and the reliability requirement, wherein the configuration information and measurements includes one or more of current channel measurements or long term channel measurements, wherein the one or more current channel measurements or long term channel measurements include one or more of path loss, channel state information (CSI), synchronization signal measurements or reference signal measurements associated with the UE; and
coordinate communications for the UE using the CoMP cluster set.

27. The non-transitory computer-readable medium of claim 26, where the code further causes the processor to adjust the CoMP cluster set of TRPs based on one or more of a number of allowed subsequent re-transmissions to the UE, configuration information and measurements, or delay budget and reliability requirement.

28. The non-transitory computer-readable medium of claim 26, wherein:
the CSI includes one or more of a channel quality indicator (CQI), precoding matrix indicator (PMI), precoding type indicator (PTI), or rank indication (RI);
the synchronization signal measurements include one or more of Primary Synchronization Signal (PSS) measurements or Secondary Synchronization Signal (SSS) measurements; and
the reference signal measurements include one or more of reference signal received power (RSRP) measurements, reference signal received quality (RSRQ) measurements or received signal strength indicator (RSSI).

29. A network entity for wireless communications comprising:
means for receiving, from a user equipment (UE), a request to form a coordinated multi-point (CoMP) cluster of transmit/receive points (TRPs) for the UE;
means for determining, in response to receiving the request to form a CoMP cluster set of TRPs for the UE, the CoMP cluster set of TRPs for the UE based on at least a delay budget and a reliability requirement, and one or more of configuration information and measurements in addition to the delay budget and the reliability requirement, wherein the configuration information and measurements includes one or more of current channel measurements or long term channel measurements, wherein the one or more current channel measurements or long term channel measurements include one or more of path loss, channel state information (CSI), synchronization signal measurements or reference signal measurements associated with the UE; and
means for coordinating communications for the UE using the CoMP cluster set.

30. The network entity of claim 29, further comprising means for adjusting the CoMP cluster set of TRPs based on one or more of a number of allowed subsequent re-transmissions to the UE, configuration information and measurements, delay budget or reliability requirement.

* * * * *